UNITED STATES PATENT OFFICE.

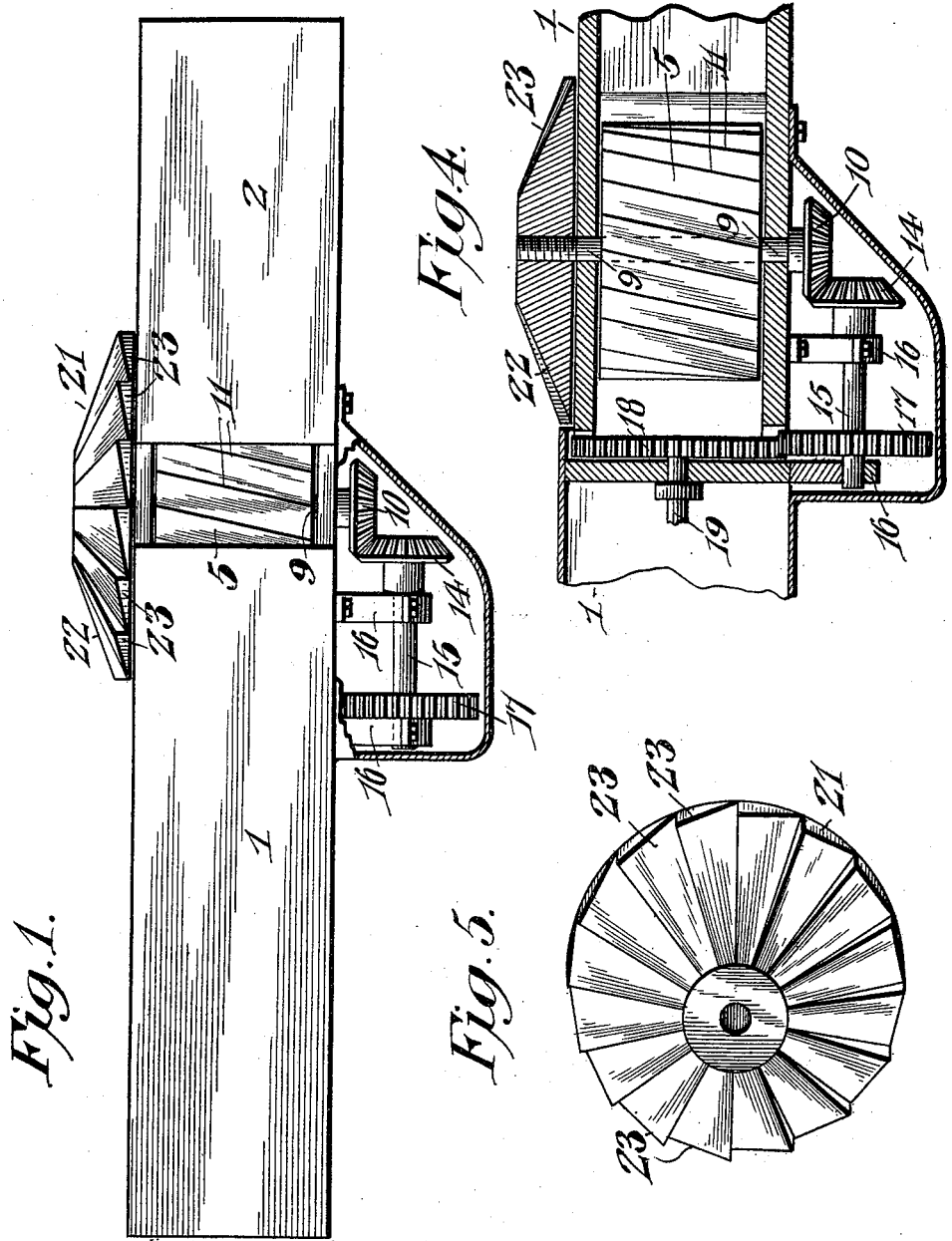

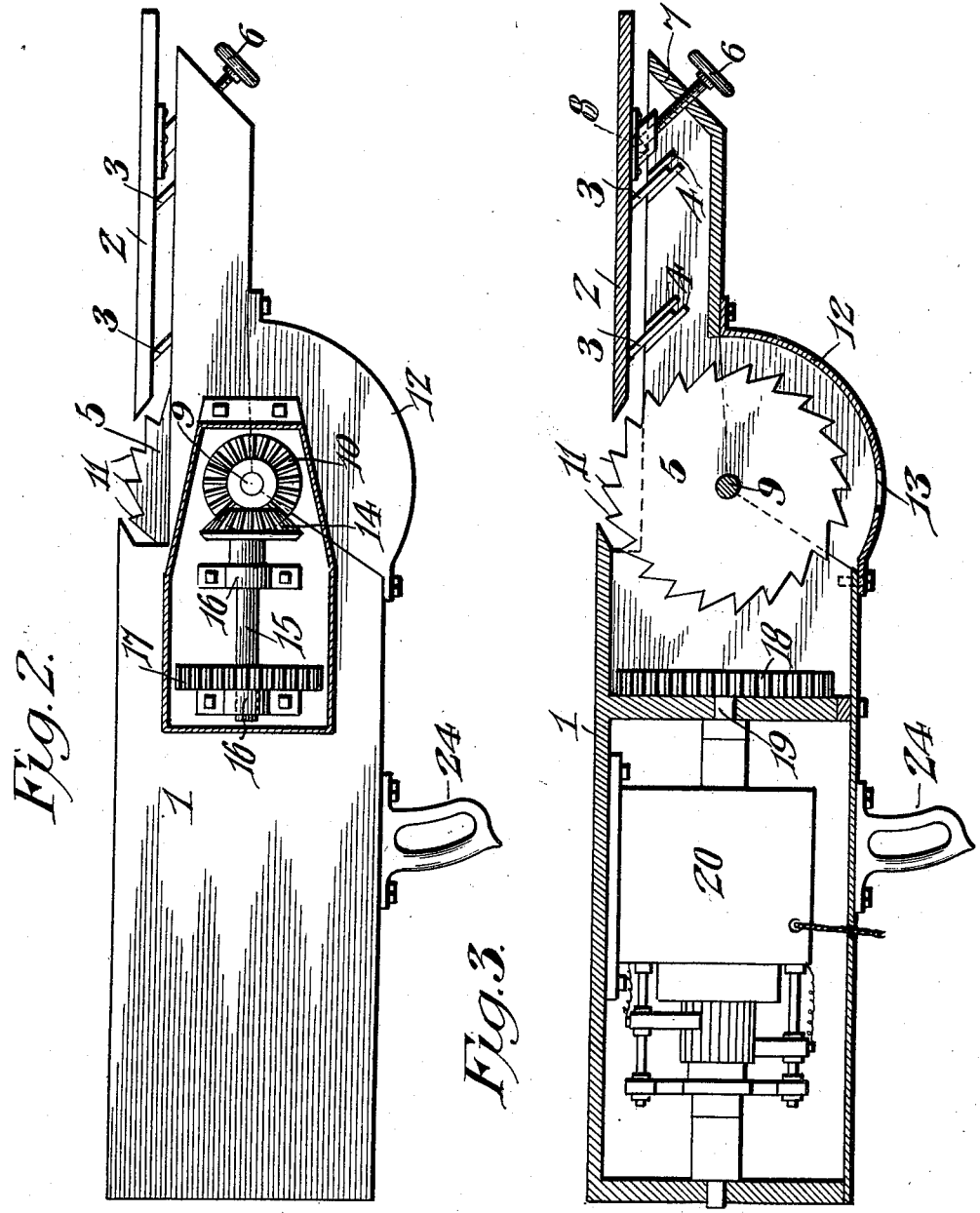

LOUIS HART KRICKEL, OF GREENVILLE, MISSISSIPPI.

HOOF-TRIMMER.

1,000,821.  Specification of Letters Patent.  Patented Aug. 15, 1911.

Application filed January 24, 1910. Serial No. 539,890.

*To all whom it may concern:*

Be it known that I, LOUIS H. KRICKEL, a citizen of the United States, residing at Greenville, in the county of Washington and State of Mississippi, have invented a new and useful Hoof-Trimmer, of which the following is a specification.

This invention has for its object the provision of a motor-driven hoof-trimming machine which may be easily manipulated by a single operator, and in which the parts will be compactly arranged, and by which the operation of trimming a horse's hoof, preparatory to applying a shoe thereto, may be expeditiously and efficiently accomplished.

These objects and such other incidental objects as will hereinafter appear, are attained in the use of the mechanism illustrated in the accompanying drawings, and the invention consists in certain novel features thereof, as will be hereinafter first fully described and then particularly pointed out in the appended claims.

In the accompanying drawings, Figure 1 is a plan view of an apparatus embodying my present invention. Fig. 2 is a side elevation of the same with a part of the casing removed. Fig. 3 is a longitudinal section of the apparatus. Fig. 4 is an enlarged detail horizontal section through the cutters. Fig. 5 is a detail perspective view of the cutting disk for cleaning out the hoof.

The frame 1 of my improved hoof trimmer consists of a casing of suitable size and shape and provided at one end, which for convenience will be designated the front end, with an adjustable plate 2 having a smooth outer side and provided on its inner side with depending lugs 3 fitting in and between cleats or ribs 4 on the inner faces of the side walls of the casing, whereby the said plate 2 is adapted to be moved toward and from the said side walls obliquely, in order to approach or recede from the cutter 5. This plate 2 is adjusted by means of a hand screw 6 mounted in the front end 7 of the casing and having its inner end 8 swiveled to the plate, as will be readily understood.

The cutter 5 consists of a wheel secured upon a shaft 9 journaled transversely in the casing and having a bevel pinion 10 on one end. The wheel 5 is of such a length as to fit snugly between the sides of the casing but without frictional contact therewith, so that it may rotate freely, and the periphery of the wheel is formed into a series of cutting teeth 11 which are disposed at an oblique angle to the sides of the wheel, whereby as the wheel is rotated, the hoof will be trimmed with a drawing, shaving action, this method of operation being productive of better results and causing less strain on the operating mechanism than that produced by a blade striking squarely against the hoof, as will be readily understood. The top wall or plate of the casing terminates adjacent to and over the cutter 5, while the plate 2 extends close to the cutter, an opening being left between the opposed edges of the top plate of the casing and the adjustable plate 2 through which the cutting teeth 11 of the cutter may act upon the hoof. The casing is also provided with a curved hood or plate 12 which extends below the cutter and is provided with an opening 13 through which the shavings may escape, the result being that the cutter is entirely inclosed and the dust and particles shaved from the hoof are prevented from flying into the eyes of the workman, or otherwise injuring or inconveniencing him.

The bevel pinion 10 on the end of the shaft 9 meshes with a similar pinion 14 on the front end of a transmission shaft 15 which is journaled in suitable bearings 16 on the side of the casing, and at the rear end of the said shaft 15, I provide a pinion 17 which meshes with a gear wheel 18 on the front end of the driving shaft 19 which extends longitudinally within the casing to the rear end of the same, and which is driven by an electric motor 20 secured within the casing, as shown most clearly in Fig. 3. It will be observed that the motor is entirely inclosed within the casing and the gearing is such that the power is transmitted directly to the cutting shaft, so that the working parts will be operated without loss of power and consequently in an economical manner.

On the end of the shaft 9, opposite the bevel pinion 10, a cutting disk 21 is secured so as to be operated thereby. This cutting disk has a beveled surface, indicated at 22, and a series of teeth 23 is formed in the said beveled portion around the disk so that the disk may be readily placed against the bottom of the hoof and hollow out the inner portion of the same. The entire beveled periphery of this flat disk 21 is formed into cutting teeth, each tooth having its outer surface extending to the front or cutting side of the succeeding tooth. The disk is arranged parallel with and close to the casing so that the casing may be placed flat against the hoof with the cutter extending into the hollow thereof, the casing being pressed against the hoof at both sides of the cutter so as to firmly support the same and properly gage the depth of the cut at all points of the same. It will also be readily seen that this disk may be utilized to produce the desired notch in the contracted heel of the hoof.

The operation of the device will be readily appreciated. The device is held in the hand of the workman and applied to the hoof so that as it is moved over the hoof, the cutter will be rotated rapidly and engage the hoof so as to shave therefrom the rough projecting portions thereof and quickly produce the desired smooth level surface to receive the horseshoe. In order to facilitate the manipulation of the device, the same is provided with a handle 24 at any convenient point of the casing, and the provision of an electric motor within the casing itself produces a compactly arranged mechanism which will be clean in its operation, and which will be under the immediate control of the operator at all times, it being understood that the circuit through the motor may be established by a switch on the side of the casing, or the said motor may be connected by means of an ordinary plug with any fixed electric system such as the street electric lighting circuit. The plate 2 is adjusted to and from the casing by means of the screw 6, so that when the device is placed against the hoof with the hoof resting on the top plate of the casing and the said plate 2, the cutter will project more or less through the opening between the said plates, and consequently make a deeper or lighter cut in the hoof, according to the condition of the hoof.

It will be observed that the gearing is of very simple form, that all the parts are inclosed, and that a single cutting shaft is utilized to operate and carry the cutter for trimming the sides of the hoof and also the cutter for hollowing out the center of the hoof, as well as for notching a contracted heel. The device can be manipulated by a single workman so as to trim a hoof more thoroughly and expeditiously than has been possible with the hand operated tools heretofore employed when two or more workmen were engaged in the task.

Having thus described the invention, what I claim as new, and desire to secure by Letters Patent, is:—

1. A hoof-trimming apparatus comprising an inclosing casing having oppositely disposed openings in its top and bottom, a cutter shaft mounted in the sides of the casing between the said openings, a cutter on said shaft arranged to project through the upper opening, means within the casing for operating said cutter, and a hoof-supporting plate adjustably mounted on the casing adjacent the said cutter and adapted to partly cover the cutter and the opening through which the cutter projects.

2. A hoof trimming apparatus comprising a casing, an electric motor housed in one end of the casing and having a shaft within and disposed longitudinally of said casing, a gear wheel in the casing on one end of the motor shaft, another shaft outside the portion of the casing housing the motor and gear wheel and disposed longitudinally of the casing parallel with the first named shaft, a gear wheel on one end of the second shaft and meshing with the gear wheel on the motor shaft, a bevel pinion on the other end of the second shaft, a third shaft extending at substantially right angles to the second shaft and traversing the casing in spaced relation to the motor and also extending at both ends through the walls of the casing, a bevel pinion on one end of the third shaft meshing with the bevel pinion on the second shaft, and hoof cutting means on the third shaft.

3. In a hoof-trimming apparatus, the combination of an inclosing casing, a cutter shaft mounted transversely therein, means within the casing for rotating said shaft, a cutting wheel secured to the shaft within the casing and having its periphery formed into a series of cutting teeth, a movable hoof-supporting plate mounted on the casing in advance of the cutting wheel and adapted to partially cover the cutting wheel and the opening through which said wheel projects, and means for adjusting the hoof-supporting plate.

4. In a hoof trimming apparatus, the combination of a casing, an electric motor disposed within the same at one end thereof, a cutter shaft disposed transversely in advance of the motor, gearing connecting the motor with the cutter shaft, a cutting wheel secured to the shaft within the casing, the latter having an opening through which the cutting wheel projects, said cutting wheel having its periphery formed into a series of cutting teeth disposed at an oblique angle to the sides of the wheel, and a plate adjustably mounted on the casing in advance of the cutting wheel and adapted to partially cover the opening through which the cutting wheel projects.

In testimony, that I claim the foregoing as my own, I have hereto affixed my signature in the presence of two witnesses.

LOUIS HART KRICKEL.

Witnesses:
G. B. JOHNSTON,
WILLIAM JAMES.